July 8, 1952 D. MAPES 2,602,466
VALVE
Filed Dec. 18, 1945 2 SHEETS—SHEET 1

INVENTOR
DANIEL MAPES
BY
J. William Carson
ATTORNEY

July 8, 1952  D. MAPES  2,602,466
VALVE
Filed Dec. 18, 1945  2 SHEETS—SHEET 2

INVENTOR
DANIEL MAPES
BY
J. William Carson
ATTORNEY

Patented July 8, 1952

2,602,466

UNITED STATES PATENT OFFICE 2,602,466

VALVE

Daniel Mapes, West Caldwell, N. J., assignor to Specialties Development Corporation, Bloomfield, N. J., a corporation of New Jersey Application December 18, 1945, Serial No. 635,746

17 Claims. (Cl. 137—653)

1

This invention relates to valves and particularly to valves of the single operation type for controlling the discharge of fluid media under high pressure.

An object of the invention is the provision of a valve of the above indicated character having a novel arrangement of parts which may be readily replaced and arranged in various orders for shipping and operation according to different conditions of service.

Another object is to render the valve more flexible in its adaptability to different service or different functions in the same service by providing certain elements which may be omitted or not employed in certain applications without increasing the size or materially adding to the cost and weight of the valve, and which will be ready for operation in other applications for which a valve of its type is employed.

Another object is to provide identical valve devices having features common to completed valves of different operation, the parts of which are adapted for operation with the devices, and certain of which constitute elements of this invention.

Another object is to provide a valve having novel means for utilizing back pressure at its main outlet for operating the valve.

Another object is to provide a pilot valve operated main valve having novel means, whereby the main valve may be operated by the fluid pressure of a container with which it is immediately associated through the operation of the pilot valve or by the fluid pressure of one or more containers with which such container may be associated through the main valve outlet by a manifold without imposing the latter pressure on the pilot valve.

Another object is to provide a device of the above indicated character that is simple and durable in construction, economical to manufacture and effective in its operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Figure 1 is a sectional view of a valve em-

2 bodying the invention, secured to the outlet of a container.

Figure 1:
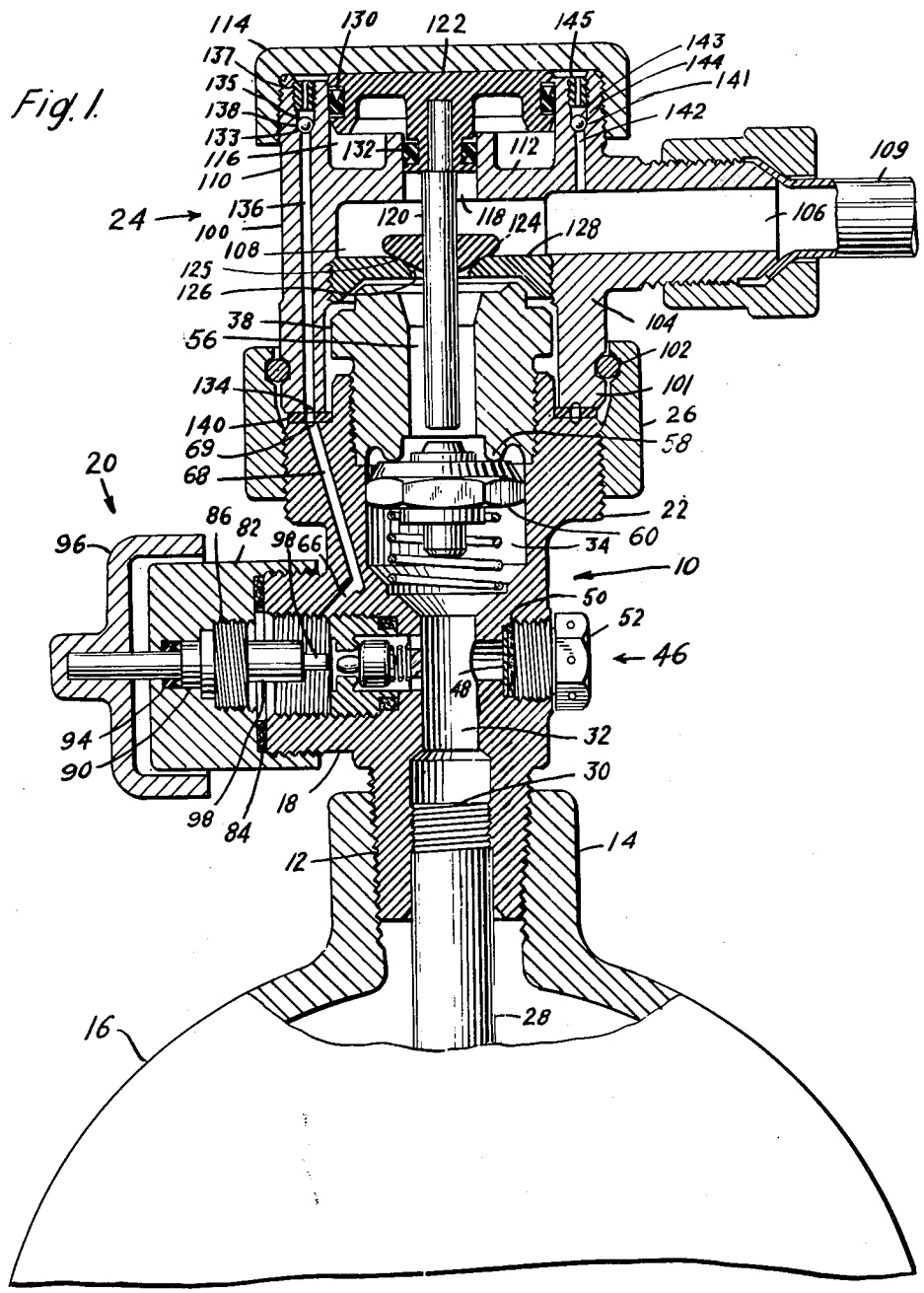

Referring to the drawings, as shown in Figure 1, the device comprises, in general, a base housing 10 having an exteriorly tapered screw-threaded inlet portion 12 for mounting in a neck 14 of a high pressure medium container 16 or similar source of fluid medium under pressure, a nipple portion 18, shown as supporting a pilot valve operating device or control head 20, a support portion 22 adapting the housing for mounting on another housing, such as a piston housing 24, a nut structure 26 cooperating between the base housing 10 and the piston housing 24, and a syphon tube 28.

Figure 2:
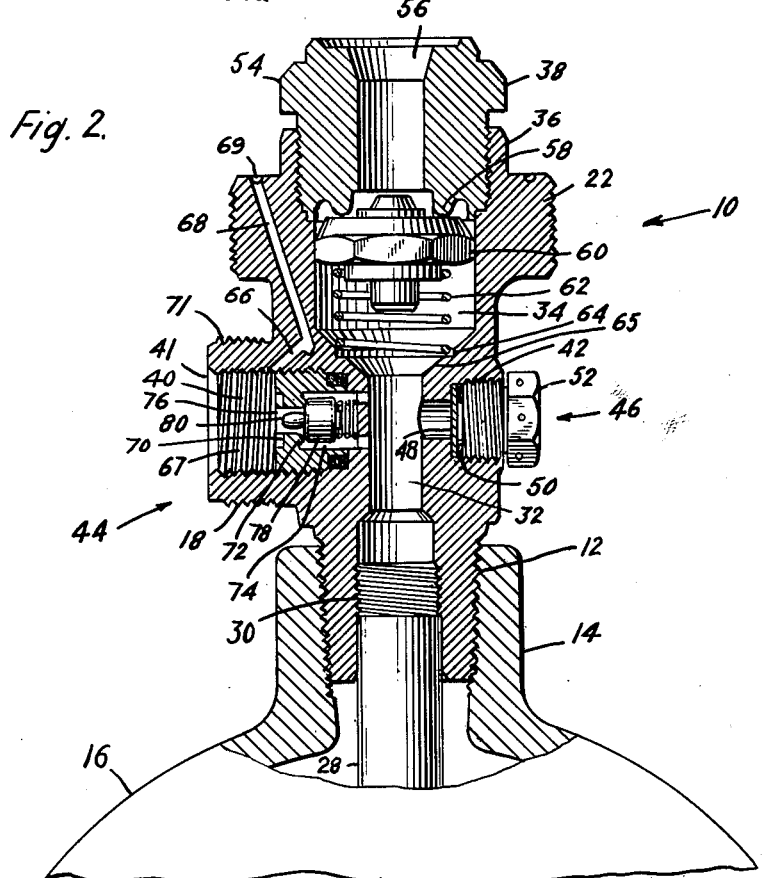
Figure 2 is a sectional view of the lower portion of the valve shown in Figure 1 with certain parts removed therefrom.

Referring to Figure 2, the base housing 10 comprises, in addition to the inlet 12, the nipple 18 and the support 22, a threaded portion 30 for supporting the syphon tube 28, a conduit portion 32 between the inlet portion 12 and a main valve chamber 34, a screw socket portion 36 for receiving a plug member 38, aligned screw socket conduit or compartment portions 40 and 42 extending transversely to, and communicating with, the conduit portion 32 for the reception of a pilot valve structure 44 in the portion 40, and a safety discharge device 46 in the portion 42 comprising a rupturable disc 48, a gasket 50 and an anti-recoil screw plug 52. The disc 48 is for relieving excess pressure in the container 16, the gasket 50 is for sealing the disk 48 and the plug 52 is for holding the disc and the gasket in position.

The plug 38 has a nut-like portion 54, an outlet conduit or bore opening 56 to the exterior of the housing 10 in line with the bore of the inlet 12, and a main valve seat 58 around the inner end of the outlet 56 at the outlet end of the main valve chamber 34.

A main valve member 60 is normally held against the seat 58 in the chamber 34 by the pressure of the fluid in the container 16, and by a spring 62 extending between the valve member 60 and a seat 64 in a tapered portion 65 of the chamber walls.

The base housing 10 also is provided with ducts 66 and 68 operating as one outlet to the exterior of the housing from a point in the pilot valve compartment 40 between an entrance 41 from the exterior of the housing and the inner end of the compartment through an annular groove 69 in the support 22. The nipple 18 is provided with screw threads 67 on the interior for receiving a pilot valve housing 70 in the form of a screw plug in the compartment 40 which is disposed between the duct 66 and the conduit portion 32. The nipple 18 is provided with screw threads 71 on the exterior thereof, for securing the pilot valve operating device or control head 20. The housing 70 forms a pilot valve seat 72 in a pilot valve chamber 74 communicating with the inlet portion 12 laterally thereof and having an outlet 76 to the entrance 41. A pilot valve member 78, in the chamber 74, is normally biased against the seat 72 by the pressure of the fluid in the container 16, with a stem 80 in the outlet 76.

The pilot valve control head 20, which, as illustrated in Figure 1 herein, is of the locally, manually operated type, operating through the entrance 41, includes a body 82 screw threadably mounted on the nipple 18, relative to which it is sealed, as by a gasket 84, the body having a screw threaded portion 86 for a correspondingly threaded portion on a shank 90, and a recess for a packing 94 about the shank 90. A hand wheel 96 is fixed to a reduced diameter outer end portion of the shank 90 which has a further reduced inner end portion 98 adapted to enter the outlet 76 to engage the pilot valve stem 80.

The head 20 may be replaced by a remotely controllable device which is operated by pull cable means, or electrically or pneumatically, or may be replaced by a screw cap to protect the pilot valve member against accidental operation to release the fluid from the container 16 during shipping.

The piston housing 24 which, with the sleeve structure 26, is so constituted relative to the base housing 10, that it may be attached thereon or shipped as a separate unit, comprises a main body housing portion 100 having means, such as the sleeve 26 and a ring 102, adjacent to one end 101, adapting it for mounting on another housing, such as the base housing 10, an intermediate portion 104 having an outlet 106 and adapted as an element of an intermediate main check valve chamber 108 for communication with the main valve chamber 34. A flexible hose or rigid conduit 109 is coupled to the outlet 106 as a delivery means to a manifold or other means for distributing or dispensing the fluid. Means, such as a wall portion 110 of the housing body 100, a partition 112, and a cap 114 adjacent to the other end of the piston housing 24, form a cylinder 116 or pressure fluid receiving chamber 116 having an opening 118 in the partition 112.

Fluid pressure actuated means such as a piston 122, or a diaphragm or bellows, in the cylinder 116, has a valve operating member or stem 120 which extends through the opening 118 and through the check valve chamber 108 into the outlet 56 for operating the main valve member 60. The stem 120, carries slidably thereon a main check valve member 124 substantially in the form of a floating disc having a conical underside 125 or the like for cooperation with a check valve seat 126 in a partition 128 of the chamber 108 to prevent the flow of fluid from the outlet 106 to the valve chamber 34. Packing glands 130 and 132 are associated with the piston 122 and the stem 120, respectively.

The piston housing 24 has an annular groove 134 at one end which communicates with a duct 136 having a check valve 138 adjacent to the other end of the housing body 100 under the cap 114 in communication with the fluid pressure side of the piston 122. The check valve 138 comprises a conical seat 133 in the duct 136, a ball 135 on the seat 133, and a bored screw plug 137 at the upper enlarged end of the duct 136 for retaining the ball in place, and is thereby adapted to permit fluid flow from the pilot valve housing 70 to the fluid pressure side of the piston 122 and to prevent the reverse of this flow. The housing 24 is thus provided with the passage 136 between the cylinder 116 at the pressure side of the piston to the exterior of the housing 24 adjacent to its end portion 101 adapting it for mounting on the housing 10. A perforate packing ring 140 between the housings 10 and 24 provides communication from the pilot valve chamber 74 to the cylinder 116, by-passing the main and check valve chambers 34 and 108, respectively, by way of the grooves 69 and 134, the perforations in the ring itself, and the ducts 66, 68 and 136, irrespective of the position in which the housing 24 may be adjusted relative to the housing 10 about the common axis of the housings, as provided for by the ring 102.

Communication between the cylinder 116 and the outlet 106 is provided, in this instance, by a duct 142 having a check valve 144 therein. This valve also comprises a conical seat 141 in the duct 142, a ball 143 on the seat 141, and a bored screw plug 145 at the upper enlarged end of the duct 142 for retaining the ball in place, and is thereby adapted to permit flow from the outlet 106 to the fluid pressure side of the piston and to prevent the reverse of this flow.

In operation, for one application, with the parts assembled as in Figure 1, when the hand wheel 96 is turned clockwise from its outer position shown, the shank 90 is advanced to the right to engage and push the stem 80 to unseat the pilot valve member 78. This action releases fluid from the container 16 through the inlet 12, the pilot valve chamber 74, the compartment 40, the ducts 66 and 68, and past the ball check valve 138 to the fluid pressure side of the piston 122, whereupon the latter pushes the stem 120 relative to the main check valve member 124 to displace the main valve member 60 from the seat 58. During this action, the pressure from the pilot valve in the cylinder 116 is prevented from passing through the duct 142 by the ball check valve 144, to thereby enable pressure to build up rapidly in the cylinder 116 to effect operation of the piston.

When the main valve member 60 is displaced from its seat 58, a main discharge flow of fluid passes from the container 16, through the inlet 12, the main valve chamber 34, the outlet 56, past the main check valve member 124, by lifting the latter slidably on the stem 120 to clear the outlet 56, to the check valve chamber 108, and from the latter through the outlet 106 and the conduit 109.

In operation, for another application, the control head 20 may remain in position as shown, or may be replaced by a cap on the nipple 18. When pressure medium enters the outlet 106, for example, due to the discharge of medium from another container into a manifold (not shown), to which the conduit 109 of the container 16 may be connected, such pressure will be blocked by the main check valve member 124, but will open the ball check valve 144, whereupon the aforesaid pressure medium will effect actuation of the piston 122, while the ball check valve 138 will prevent escape of the medium to the atmosphere. When the piston 122 is thus operated, it will operate the stem 120 to unseat the main valve member 60 and to cause discharge of the medium in the container 16, as above described.

During shipment of the container, the piston housing 24 and pilot valve control head 20 may be removed from the lower portion or base housing 10 of the valve, as shown in Figure 2, and a cap (not shown) may be placed on the nipple 18, whereby accidental, unintentional or unauthorized opening of the main valve or pilot valve is prevented.

Figure 3:
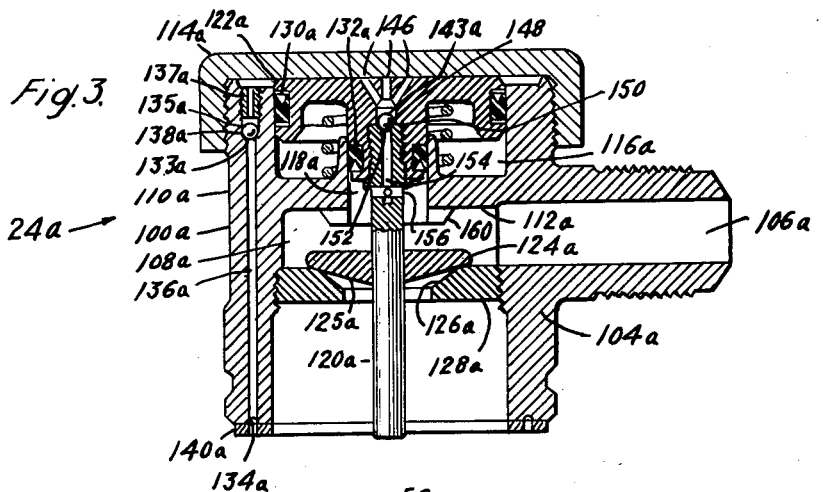
Figure 3 is a sectional view of a modified upper portion of the valve.

In Figure 3, corresponding parts are indicated by corresponding reference numerals having the suffix $a$, to illustrate a modified piston housing 24$a$ adapted to be secured to a base housing 10, such as shown in Figures 1 and 2. The housing 24$a$ differs from the housing 24, shown in Figure 1, in that, the duct 142, the seat 141, the ball 143 and the plug 145, constituting the check valve 144, are omitted.

Communication between the cylinder 116$a$ and the outlet 106$a$ is provided in this modification, by branch ducts 146 in the piston 122$a$ of a main duct 148 having a check valve 150 therein. This valve comprises a conical seat 152 in a duct 154 of the stem 120$a$, a ball 143$a$ on the seat 152, and lateral ducts 156 communicating between the duct 154 and the outlet 106$a$ through the check valve chamber 108$a$. A centrally and radially slotted boss 160 at the underside of the partition 112$a$ acts as an upper stop for the main check valve member 124$a$, whereby the latter, in its upper position, does not close the opening 118$a$.

The operation of piston housing 24$a$ is similar to the operation of the piston housing 24.

From the foregoing description, it will be seen that novel valve devices have been provided which are readily combined and adapted to different applications, or to different functions of the same application. The valve member may be operated from its immediately associated source of pressure, or from one or more other sources with which it may be associated through its outlet and a manifold to which the other sources are connected. The parts of the valve are made readily interchangeable, the elements may be better standardized and conditioned for shipping and assembly, and repair and rearrangement are facilitated. The valve of the present invention is a distinct advance in its field, and is especially adapted for more effectively conserving life and property in fire extinguishing service, as in ships, aircraft, factories, offices and many other places.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A valve comprising a housing formed with a valve chamber having an inlet and an outlet, a valve seat and a cylinder; fluid passage means directly connecting said cylinder and said outlet; a valve member in said valve chamber for said seat normally preventing the flow of fluid under pressure from said inlet through said valve chamber to said outlet; a piston in said cylinder; means operated by said piston to unseat the valve member; a check valve controlling said passage means to prevent the flow of fluid from said cylinder to said outlet; said housing being formed with a pilot valve chamber communicating with said inlet of said valve chamber and having a fluid connection extending from said pilot valve chamber to said cylinder; a pilot valve member in said pilot valve chamber for controlling the flow of the fluid through said connection from said pilot valve chamber to said cylinder; and a check valve controlling said connection to prevent the flow of fluid from said cylinder to said pilot valve chamber.

2. A valve comprising a housing formed with a main valve chamber having an inlet, a cylinder, and a check valve chamber communicating with said main valve chamber and having an outlet; a main valve member in said main valve chamber normally preventing the flow of fluid under pressure from said inlet through said main valve chamber to said check valve chamber; a piston in said cylinder; a stem extending from said cylinder to said main valve chamber operated by said piston to actuate the main valve member; a check valve member preventing the flow of fluid from said check valve chamber to said main valve chamber, said housing being formed with a pilot valve chamber communicating with the inlet side of said main valve chamber and having a fluid connection by-passing said main and check valve chambers and extending from said pilot valve chamber to said cylinder at the fluid pressure side of said piston; a pilot valve member in said pilot valve chamber for controlling the flow of the fluid through said connection from said pilot valve chamber to said cylinder; a check valve controlling said connection to prevent the flow of fluid from said cylinder to said pilot valve chamber; fluid passage means between the fluid pressure side of said cylinder and said outlet; and a check valve controlling said passage means to prevent flow of fluid from said cylinder to said outlet.

3. In a valve, the combination of a housing formed with a main valve chamber having an inlet at one end provided with means for securing said housing to a pressure medium container and having an outlet at its other end opposite to and in axial alignment with said inlet, said housing being formed with a pilot valve chamber disposed laterally of said inlet and having an entrance from the exterior of said housing provided with means for securing a pilot valve operating device; main valve seat means at said outlet provided with an opening to the exterior of said housing for receiving a main valve operating member; a main valve member in said main valve chamber; pilot valve seat means in said pilot valve chamber having an opening to said entrance; and a pilot valve member in said pilot valve chamber between said inlet and said pilot valve seat means; said housing having conduit means extending from between said entrance and the opening of said pilot valve seat means to the exterior of said housing.

4. In a valve, the combination of a housing formed with a main valve chamber having an inlet at one end provided with means for securing said housing to a high pressure medium container and having an outlet at its other end opposite to and in axial alignment with said inlet and provided with means for securing a valve operating device on said housing, said housing being formed with a pilot valve chamber disposed laterally of said inlet and having an entrance from the exterior of said housing provided with means for securing a pilot valve operating device; a main valve seat member removably secured to said housing at said outlet and provided with a central opening to the exterior of said housing for receiving a main valve operating member; a main valve member in said main valve chamber; a pilot valve seat member in said pilot valve chamber secured to said housing and having an opening to said entrance; and a pilot valve member in said pilot valve chamber between said inlet and said pilot valve seat member; said housing having conduit means extending from between said entrance and the opening of said pilot valve seat member to the exterior of said housing.

5. In a valve of the class described, the combination of a housing having means adjacent to one end adapting it for mounting on another housing, an intermediate portion having an outlet and adapted as an element of a check valve chamber, and means adjacent to an opposite end formed with a cylinder having an opening; a check valve member in said chamber having a central aperture; a valve operating stem extending from said cylinder through said opening and the check valve chamber and said aperture of said check valve member; a piston in said cylinder for actuating said stem; said housing being formed with a passage between said cylinder at the pressure side of said piston to the exterior of said housing adjacent to the first mentioned end thereof; a housing formed with a main valve chamber detachably secured to said first housing and having an inlet and an outlet in communication with the check valve chamber, said main valve housing being formed with a passage extending from said inlet to the exterior thereof adjacent to said first passage; means for establishing communication between said passages; and a main valve member in said main valve chamber structurally independent of and positioned to be actuated by said stem only to be unseated thereby.

6. In a valve of the class described, the combination of a housing having means adjacent to one end adapting it for mounting on another housing, an intermediate check valve chamber having an outlet, and means adjacent an opposite end forming a cylinder having an opening; a check valve in said check valve chamber; a valve operating stem extending from said cylinder through said opening and said check valve chamber; a piston in said cylinder for actuating said stem; means providing a passage between said cylinder at the pressure side of said piston and said outlet; and check valve means in said last passage adapted for closing the same in response to pressure medium in said cylinder at the pressure side of said piston.

7. In a valve of the class described, the combination of a housing having means adjacent to one end adapting it for mounting on another housing, an intermediate check valve chamber having an outlet, and means adjacent an opposite end formed with a cylinder having an opening; a check valve in said check valve chamber; a piston in said cylinder; and a valve operating stem for actuation by said piston extending from said cylinder through said opening and said check valve member and provided with passageway means between said cylinder at the pressure side of said piston and said outlet.

8. In a valve of the class described, the combination of a housing having means adjacent to one end adapting it for mounting on another housing, an intermediate check valve chamber having an outlet, and means adjacent to an opposite end formed with a cylinder having an opening; a check valve in said check valve chamber; a piston in said cylinder; a valve operating stem for actuation by said piston extending from said cylinder through said opening and said check valve member and provided with passageway means between said cylinder at the pressure side of said piston and said outlet; and means in said check valve chamber for preventing closure of said passageway means by said check valve.

9. A valve comprising a housing forming a valve chamber having an inlet and an outlet and a cylinder; a valve member in said valve chamber normally preventing the flow of fluid under pressure from said inlet through said valve chamber to said outlet; means including a piston in said cylinder for actuating said valve member and provided with fluid passage means between said cylinder and said outlet; a check valve controlling said passage means to prevent the flow of fluid from said cylinder to said outlet; said housing being formed with a pilot valve chamber communicating with said inlet of said valve chamber and having fluid connection extending from said pilot valve chamber to said cylinder; and a pilot valve member in said pilot valve chamber for controlling the flow of fluid through said connection from said pilot valve chamber to said cylinder.

10. A valve assembly comprising a housing having an inlet, an outlet, an intermediate main valve chamber, a check valve chamber intermediate said main valve chamber and said outlet and a cylinder; a main valve in said main valve chamber normally preventing the flow of fluid from the inlet through the main and check valve chambers to said outlet; fluid pressure actuated means in said cylinder for opening said main valve; a fluid flow connection between said inlet and said fluid pressure actuated means; a pilot valve in said connection for controlling the flow of fluid therein; a second fluid flow connection for establishing communication between said outlet and said fluid pressure actuated means; check valve means in said second fluid flow connection for preventing the flow of fluid from said cylinder to said outlet; and check valve means in said check valve chamber for preventing the flow of fluid from said check valve chamber to said main valve chamber.

11. In a valve of the class described, the combination of a housing having means adjacent the lower end thereof adapting it for mounting on another housing, an intermediate check valve chamber including spaced upper and lower walls each having an aperture therein and an outlet between said walls and a cylinder at the upper end thereof adjacent said upper wall; a check valve member for the aperture of said lower wall formed with an aperture; a piston in said cylinder; a stem adapted to be operated by said piston extending through all of said apertures and outwardly beyond said lower end of said housing; said housing being formed with a passage extending from said cylinder at the pressure side of said piston to the exterior of said housing adjacent said lower end thereof adapting it for connection to a passage of another housing.

12. In a valve, the combination of a lower housing formed with a main valve chamber having an inlet at its lower end provided with means for securing said housing to a source of high pressure fluid medium and having an outlet at its upper end in axial alignment with said inlet, said housing being formed with a pilot valve chamber disposed laterally of said inlet and having an entrance from the exterior of said housing provided with means for securing a pilot valve operating device; main valve seat means at said outlet provided with an opening; a main valve member in said main valve chamber; pilot valve seat means in said pilot valve chamber having an opening to said entrance; a pilot valve member in said pilot valve chamber between said inlet and said pilot valve seat means; said housing being formed with a passage extending from between said entrance and the pilot valve seat means to the exterior of said housing adjacent its upper end; an upper housing on said lower housing having a check valve chamber including spaced upper and lower walls each having an aperture therein and a discharge outlet between said walls, and a cylinder at the upper end thereof adjacent said upper wall; a check valve member for the aperture of said lower wall formed with an aperture; a piston in said cylinder; a stem adapted to be operated by said piston extending through all of said apertures and into said main valve seat means opening for unseating said main valve upon operation of said piston; said upper housing being formed with a passage extending from said cylinder at the pressure side of said piston to the exterior of said housing adjacent said lower end and positioned for connection with said lower housing passage; and means for detachably securing the upper end of said lower housing and the lower end of said upper housing.

13. A valve according to claim 12, wherein said upper housing passage is provided with a check valve for preventing the flow of fluid medium from said cylinder towards said lower housing passage.

14. A valve according to claim 12, wherein said upper housing has a passage extending from said discharge outlet to said cylinder at the pressure side of said piston, and a check valve is provided in said last mentioned passage for preventing the flow of fluid medium from said cylinder to said discharge outlet.

15. A valve according to claim 12, wherein said upper housing passage is provided with a check valve for preventing the flow of fluid medium from said cylinder towards said lower housing passage, said upper housing has a second passage extending from said discharge outlet to said cylinder at the pressure side of said piston, and a check valve is provided in said last mentioned passage for preventing the flow of fluid medium from said cylinder to said discharge outlet.

16. A valve comprising a housing including a main valve chamber having an inlet and a wall portion provided with a passage formed with a main valve seat at one end thereof facing said inlet and an outlet port at the other end thereof, a pressure fluid receiving chamber, and a check valve chamber intermediate said main valve chamber and said pressure fluid receiving chamber having a discharge outlet and a wall portion formed with an opening adjacent said outlet port provided with a check valve seat at the interior of said check valve chamber; a main valve member in said main valve chamber for said main valve seat; fluid pressure actuated means in said pressure fluid receiving chamber; means operable by said last means to move said main valve member off its seat; a check valve member for said check valve seat for preventing fluid entering said discharge outlet from passing through said opening; said housing being formed with a pilot valve chamber communicating with said inlet of said main valve chamber and having a fluid connection extending from said pilot valve chamber to said pressure fluid receiving chamber; and a pilot valve member in said pilot valve chamber for controlling the flow of the fluid through said connection.

17. A valve comprising a housing including a main valve chamber having an inlet, a wall portion provided with a passage formed with a main valve seat at one end thereof facing said inlet end and an outlet port at the other end thereof, a cylinder, and a check valve chamber intermediate said cylinder and said main valve chamber, said check valve chamber including a pair of spaced walls each formed with an aperture and a discharge outlet intermediate said walls, one of said walls providing an end wall of said cylinder and the other of said walls being adjacent said main valve chamber wall portion and having a valve seat about its aperture at the interior of said check valve chamber, said main valve chamber inlet and outlet port and said apertures being in axial alignment; a main valve member in said main valve chamber for said main valve seat; a piston in said cylinder; a stem operated by said piston extending through said apertures to move the main valve member off its seat; a check valve member for said check valve seat having a central aperture through which said stem extends for preventing fluid entering said discharge outlet from passing through the check valve aperture; said housing being formed with a pilot valve chamber communicating with the inlet side of said main valve chamber and having a fluid connection extending from said pilot valve chamber to said cylinder; and a pilot valve member in said pilot valve chamber for controlling the flow of the fluid through said connection.

DANIEL MAPES.

REFERENCES CITED

The following references are of record in the file of this patent:

UNITED STATES PATENTS

| Number | Name | Date |
| --- | --- | --- |
| 919,513 | Zindel | Apr. 27, 1909 |
| 1,004,650 | Hilton | Oct. 3, 1911 |
| 1,808,074 | Rike | June 2, 1931 |
| 2,147,084 | Bouchard | Feb. 14, 1939 |
| 2,205,033 | Dreyer | June 18, 1940 |
| 2,273,856 | Freygang | Feb. 24, 1942 |
| 2,337,841 | Shafer | Dec. 28, 1943 |
| 2,383,961 | Freygang | Sept. 4, 1945 |
| 2,418,817 | Cantlin | Apr. 15, 1947 |
| 2,480,712 | Carbon | Aug. 30, 1949 |